United States Patent
Headley et al.

(10) Patent No.: US 8,006,291 B2
(45) Date of Patent: Aug. 23, 2011

(54) MULTI-CHANNEL MULTI-FACTOR AUTHENTICATION

(75) Inventors: Paul Headley, Hollister, CA (US); Kevin Collins, Goodyear, AZ (US)

(73) Assignee: Veritrix, Inc., Palo Alto, CA (US)

( * ) Notice: Subject to any disclaimer, the term of this patent is extended or adjusted under 35 U.S.C. 154(b) by 573 days.

(21) Appl. No.: 12/119,617

(22) Filed: May 13, 2008

(65) Prior Publication Data
US 2009/0288148 A1    Nov. 19, 2009

(51) Int. Cl.
H04L 9/32 (2006.01)
G06F 15/16 (2006.01)
G06F 21/20 (2006.01)
H04K 1/00 (2006.01)

(52) U.S. Cl. ............ 726/7; 726/6; 726/18; 726/19; 713/186

(58) Field of Classification Search .............. None
See application file for complete search history.

(56) References Cited

U.S. PATENT DOCUMENTS

| | | | |
|---|---|---|---|
| 5,958,016 A | 9/1999 | Chang et al. | |
| 6,496,595 B1 * | 12/2002 | Puchek et al. | 382/124 |
| 6,581,042 B2 | 6/2003 | Pare, Jr. et al. | |
| 6,697,947 B1 | 2/2004 | Matyas, Jr. et al. | |
| 6,819,219 B1 | 11/2004 | Bolle et al. | |
| 6,907,408 B2 | 6/2005 | Angel | |
| 6,934,858 B2 * | 8/2005 | Woodhill | 726/5 |
| 6,993,166 B2 | 1/2006 | Lo et al. | |
| 7,240,363 B1 | 7/2007 | Ellingson | |
| 7,277,891 B2 | 10/2007 | Howard et al. | |
| 7,319,987 B1 | 1/2008 | Hoffman et al. | |
| 7,333,635 B2 | 2/2008 | Tsantes et al. | |
| 7,334,259 B2 | 2/2008 | Haala | |
| 7,349,557 B2 | 3/2008 | Tibor | |
| 7,383,572 B2 * | 6/2008 | Rolfe | 726/5 |
| 7,461,258 B2 * | 12/2008 | Rolfe | 713/176 |
| 7,522,751 B2 | 4/2009 | White et al. | |
| 7,545,961 B2 | 6/2009 | Ahern et al. | |
| 7,545,962 B2 | 6/2009 | Peirce et al. | |
| 7,676,439 B2 | 3/2010 | Tattan et al. | |
| 7,685,629 B1 | 3/2010 | White et al. | |
| 7,690,032 B1 | 3/2010 | Peirce | |
| 7,698,322 B1 | 4/2010 | Langley | |
| 7,702,918 B2 | 4/2010 | Tattan et al. | |
| 7,835,548 B1 | 11/2010 | Langley | |
| 7,865,449 B2 | 1/2011 | Tattan et al. | |
| 7,865,937 B1 | 1/2011 | White et al. | |
| 7,941,380 B2 | 5/2011 | Tattan et al. | |

(Continued)

OTHER PUBLICATIONS

International Search Report and Written Opinion, PCT/US09/43363 (May 8, 2009), dated Jul. 16, 2009.

(Continued)

*Primary Examiner* — Christopher Revak
(74) *Attorney, Agent, or Firm* — Peters Verny, LLP

(57) ABSTRACT

Systems and methods for authenticating electronic transactions are provided. The authentication methods employ a combination of security features and communication channels. These security features can be based, for example, on unique knowledge of the person being authenticated, a unique thing that the person has, unique personal features and attributes of the person, the ability of the person to respond, and to do so in a fashion that a machine cannot, and so forth. Methods for enrolling the person prior to authentication are also provided, as well as systems for enrollment and authentication.

33 Claims, 5 Drawing Sheets

U.S. PATENT DOCUMENTS

| | | |
|---|---|---|
| 2002/0152179 A1 | 10/2002 | Racov |
| 2002/0174347 A1 | 11/2002 | Ting |
| 2003/0046541 A1 | 3/2003 | Gerdes et al. |
| 2003/0163739 A1 | 8/2003 | Armington et al. |
| 2005/0091338 A1 | 4/2005 | de la Huerga |
| 2006/0041755 A1* | 2/2006 | Pemmaraju .................. 713/182 |
| 2007/0107016 A1* | 5/2007 | Angel et al. .................... 725/61 |
| 2007/0107017 A1* | 5/2007 | Angel et al. .................... 725/62 |
| 2007/0107021 A1* | 5/2007 | Angel et al. .................... 725/86 |
| 2007/0226787 A1 | 9/2007 | Maletsky et al. |
| 2008/0052527 A1 | 2/2008 | Siedlarz |
| 2008/0077524 A1 | 3/2008 | Greene |
| 2008/0077525 A1 | 3/2008 | Willey et al. |
| 2008/0077526 A1 | 3/2008 | Arumugam |
| 2008/0091618 A1* | 4/2008 | Obrea et al. .................... 705/76 |
| 2008/0113786 A1 | 5/2008 | Alderucci et al. |
| 2009/0164796 A1 | 6/2009 | Peirce |
| 2009/0309698 A1* | 12/2009 | Headley et al. .............. 340/5.52 |
| 2010/0107230 A1* | 4/2010 | Tyagi et al. ...................... 726/6 |
| 2010/0312763 A1 | 12/2010 | Peirce |
| 2011/0035788 A1 | 2/2011 | White et al. |

OTHER PUBLICATIONS

International Search Report and Written Opinion, PCT/US09/47049 (Jun. 11, 2009), dated Sep. 1, 2009.

International Search Report and Written Opinion, PCT/US09/48842 (Jun. 26, 2009), dated Aug. 3, 2009.

U.S. Appl. No. 12/137,129, Paul Headley, Single-Channel Multi-Factor Authentication, filed Jun. 11, 2008.

U.S. Appl. No. 12/166,792, Paul Headley, Systems and Methods for Controlling Access to Encrypted Data Stored on a Mobile Device, filed Jul. 2, 2008.

* cited by examiner

MULTI-CHANNEL MULTI-FACTOR AUTHENTICATION

BACKGROUND OF THE INVENTION

1. Field of the Invention

The present invention relates generally to the field of authentication and more particularly to authenticating parties to electronic financial and other transactions.

2. Description of the Prior Art

Present-day commerce increasingly relies on electronic transactions, and as such, a party to a proposed transaction needs to be able to verify that the other parties to the proposed transaction are legitimate. Illegitimate other parties include hackers, those interested in perpetrating identity theft, and those interested in perpetrating fraud, to name but a few. Accordingly, various authentication methodologies have been developed to verify a party's identity prior to an electronic transaction. Unfortunately, prior art methods all have weaknesses that can be exploited or that introduce burdens on users and managing organizations.

For example, the use of a password is a common method to verify a person's identity. However, passwords can be determined through trial and error, copied from electronic communications, and learned in various ways, such as watching a person typing on a keyboard. Other forms of authentications offer higher degrees of security, but still have vulnerabilities. For instance, biometric data cannot be copied simply by looking over a person's shoulder, but can still be duplicated. Fingerprints can be lifted off of drinking glasses, biometric data can be intercepted in electronic communications, voices can be recorded, and so forth. As those seeking to defeat authentication systems become more sophisticated, new authentication systems have had to become more complex, and generally more cumbersome for the users. What is needed, therefore, is an authentication system that is simple, rapid, and secure against illegitimate use.

SUMMARY

An exemplary method for authenticating a user comprises receiving a claimant target over a first channel. In some instances the claimant target can comprise a user ID, while in other instances the method comprises determining the user ID from the claimant target. The exemplary method also comprises retrieving a device address associated with a user ID and sending a prompt over a second channel to a device associated with the device address, where the prompt is one of a plurality of prompts, and each of the plurality of prompts has a biometric template of the user associated therewith. The exemplary method further comprises receiving a biometric response to the prompt and determining a match between the biometric response and a biometric template associated with the prompt that was sent over the second channel. In some embodiments the exemplary method further comprises selecting the prompt from the plurality of prompts.

Another exemplary method for authenticating a user comprises receiving a claimant target over a first channel. Here too, in some instances the claimant target can comprise a user ID, while in other instances the method comprises determining the user ID from the claimant target. The exemplary method also comprises establishing a second channel to a device associated with the device address, and sending a prompt to the user, where the prompt is one of a plurality of prompts, and each of the plurality of prompts has a biometric template of the user associated therewith. The exemplary method further comprises receiving a biometric response to the prompt over the second channel and determining a match between the biometric response and a biometric template associated with the prompt sent over the second channel. In some embodiments, sending the prompt to the user comprises sending the prompt over the first channel. Some embodiments the exemplary method further comprise selecting the prompt from the plurality of prompts.

Still another exemplary method for authentication consists of a claimant submitting a unique identifier over a first channel, the claimant receiving a prompt on a device, such as a hand-held device, and the claimant submitting a biometric response to the prompt, where one of the two steps of receiving the prompt and submitting the biometric response is performed over a second channel. In some instances the prompt comprises a personalized prompt.

Authentication systems are also provided herein. An exemplary authentication system comprises both enrollment and authentication logic. The enrollment logic is configured to enroll a user by associating the user with a user ID, associating the user ID and with a device address, associating a plurality of prompts with the user ID, and associating a plurality of biometric templates each with one of the plurality of prompts. The authentication logic is configured to authenticate a claimant as the user by receiving a claimant target over a first channel, retrieving a device address associated with the user ID, sending a prompt from the plurality of prompts to a device associated with the device address over a second channel, receiving a biometric response to the prompt, and determining a match between the biometric response and a biometric template associated with the prompt. In some of these embodiments, the enrollment logic is further configured to associate the plurality of prompts with the user ID by presenting a set of pre-defined prompts to the user and receiving a selection of the plurality of prompts therefrom. The enrollment logic can be further configured to allow the user to create a personalized prompt.

Another exemplary authentication system comprises authentication logic. The authentication logic configured to authenticate a claimant by receiving a claimant target over a first channel, retrieving a device address associated with a user ID, sending a prompt from a plurality of prompts to a device associated with the device address over a second channel, receiving a biometric response to the prompt, and determining a match between the biometric response and a biometric template associated with the prompt. In some instances the claimant target can comprise the user ID, while in other instances the authentication logic comprises determining the user ID from the claimant target. In some embodiments the authentication logic is further configured to send a key for encryption and/or creating a watermark. The prompt can include the key, in some instances. In further embodiments the key is set to expire within a period of time.

DETAILED DESCRIPTION

Figure 1:
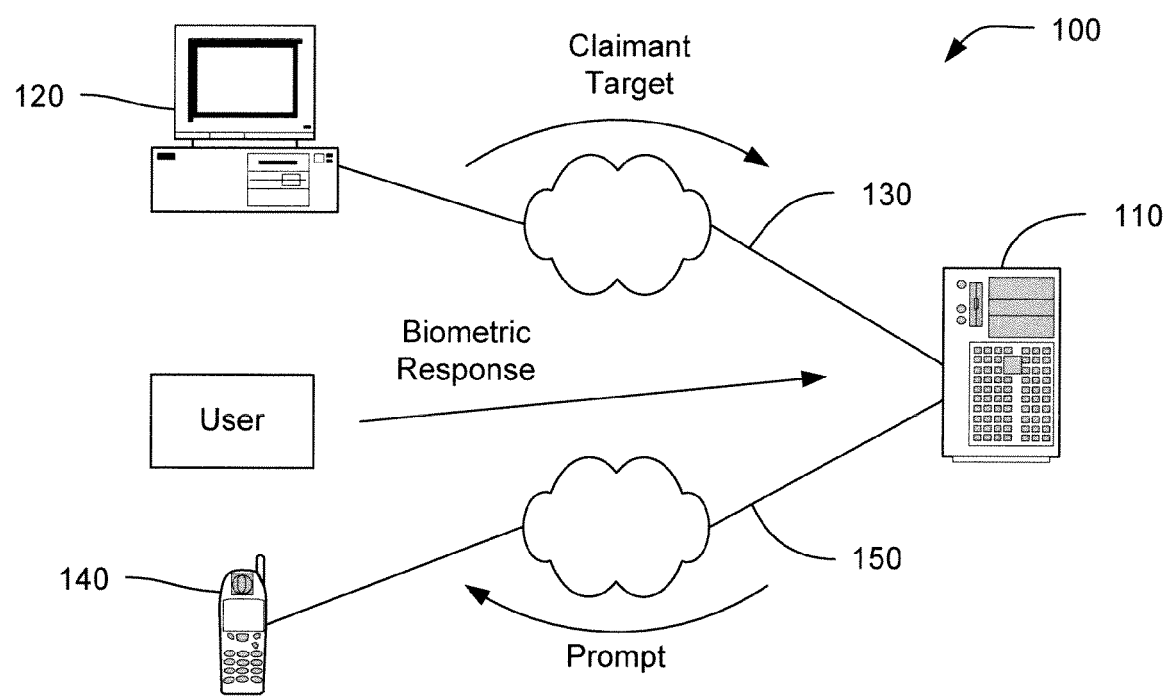
FIG. 1 is a schematic representation of an exemplary environment for carrying out various methods described herein.

The present disclosure is directed to systems and methods for authenticating electronic transactions, such as financial transactions as well as access to sensitive or secret information like medical records, corporate business and intellectual property, and military secrets. The authentication methods described herein employ a number of security features in combination to provide authentication that is quick, convenient, and resistant to compromise. The security features can be based, for example, on unique knowledge of the user, a unique thing that the user has, unique personal features and attributes of the user, the ability of the user to respond, and to do so in a fashion that a machine cannot, that only a fraction of the authentication information is made available in any one authentication attempt, and so forth.

The methods described herein comprise an initial enrollment and subsequent authentications. In the initial enrollment process, an enrollee user is associated with a user ID and that user ID is further associated with the address of a communication device for the user. The user is also asked to provide biometric samples in response to a plurality of different prompts. The prompts and responses are also associated with the user ID. After enrollment, a person seeking to be authenticated, termed a claimant herein, first submits a claimant target which can be the user ID or some other unique identifier from which the authentication system can infer the particular identity sought to be authenticated. One of the prompts associated with the user ID is then provided to the claimant, the claimant provides a biometric response to the prompt, and that response is compared to the biometric sample previously associated with that prompt. Within this simple framework a variety of security features can be effectively employed.

One such security feature is achieved through the use of biometrics which provides security based on the uniqueness of various personal features, attributes, and behaviors such as one's fingerprint, voice, eyes, face, genetic material, scent, signature, and so forth. Another security feature can be achieved through the use of responses to prompts which require the user's unique knowledge to respond correctly. In some instance, multiple pairs of prompts and responses are stored, though only one pair need be used for any authentication attempt. In these embodiments, another security feature is realized because only a fraction of the authentication information is made available in any one authentication attempt. Still another security feature can be achieved by implementing a rule that the same prompt from the plurality of prompts cannot be used in successive authentications. This rule makes it more difficult to record the biometric response from a legitimate authentication and replay that response in a fraudulent authentication attempt.

Yet another security feature can be achieved through the use of two channels of communication between the authentication system and the claimant. To complete the authentication, a second communication channel is established using the device address recorded during the enrollment process. The second channel is different from the communication channel over which the authentication system received the claimant target. Here, the prompt is provided to the claimant over the second channel, and/or the biometric response to the prompt is returned to the authentication system over the second channel. The use of the second channel to the device associated with the previously recorded device address makes fraudulent activity more difficult because a party seeking to perpetrate a fraud would need to have access to some unique thing that the enrolled user has, such as a cell phone. Still further security features, described in more detail below, can also be employed.

FIG. 1 shows an exemplary environment 100 for carrying out various methods described herein. The environment 100 comprises an authentication system 110 in communication with a first device 120 over a first communication channel 130, and in communication with a second device 140 over a second communication channel 150. The authentication system 110 can comprise one or more servers, data storage devices, workstations, and the like, networked together and configured to perform the functions described herein. The authentication system 110 is preferably implemented in a secure environment to prevent both external and internal tampering. The authentication system 110 is configured to implement authentications, described in more detail with respect to FIG. 3, and in some embodiments the authentication system 110 is also configured to implement user enrollment. Alternatively, enrollment can be implemented by a separate system in communication with the authentication system 110. The enrollment process is described in detail with respect to FIG. 2.

To implement an authentication, in various embodiments, the authentication system 110 receives a claimant target from the first device 120, sends a prompt to the second device 140, receives a biometric response from either the first device 120 or the second device 140, and compares the biometric response with the biometric sample that was previously associated with the prompt. Biometric responses, as well as biometric samples which are also referred to herein as a biometric signatures or biometric templates, are discussed in greater detail below. Upon completion of a successful authentication, the authentication system 110 may communicate the successful result to either or both of the authenticated user and other parties to a transaction. The authentication system 110 is discussed further with respect to FIG. 4.

The first device 120 is a communication device that can communicate a claimant target to the authentication system 110. Exemplary first devices 120 include servers, personal computers (PCs), laptops, personal digital assistants (PDAs), cell phones, smart phones (such as Treos, BlackBerries, etc.), kiosks, and so forth. The claimant target can simply be, for example, the user ID associated with the user during the enrollment process. The claimant target can also be a biometric input that has been associated with the user ID, such as a scan of a fingerprint. A biometric input can be indistinguishable from a biometric response (e.g., both can be an iris scan), but are referred to herein by separate terms to distinguish between their uses in the various methods. In other words, a biometric input is used as a claimant target to indicate the identity sought to be authenticated, while a biometric response is provided in response to a prompt sent from the authentication system to authenticate the claimant.

In those instances where the claimant target is a string of alphanumeric characters, an e-mail address, or the like, the first device 120 can comprise a keypad, keyboard, touch-sensitive screen, or the like on which the claimant target can be entered. Where the claimant target is a biometric input, the first device 120 can comprise a camera capable of taking still images and/or providing video images. The first device 120 can also include other biometric entry devices such as a touch pad for recording signatures, an iris scanner, a fingerprint reader, and so forth. Biometric inputs and responses are discussed in greater detail below.

It should be noted that in some instances the claimant sends the claimant target from the first device 120, while in other instances another party to the transaction, such as a merchant, a financial institution, or another individual sends the claimant target to/from the first device 120. Thus, in the former situation the first device 120 may be a device in the claimant's home, such as a PC, interactive TV system, gaming console, or the like, or a hand-held device that the claimant carries, such as a smart phone or PDA. The claimant can also send the claimant target from a first device 120 such as a kiosk or a terminal in a retail store, for example. In the latter situation, where the other party sends the claimant target, the first device 120 may be physically remote from the claimant, such as a web server (this is sometimes referred to as a Cardholder-Not-Present (CNP) transaction environment). In some of these embodiments, the first device 120 stores the claimant target (e.g., an on-line retailer can store the claimant targets of registered shoppers for their convenience) or receives the claimant target from the claimant at the beginning of the authentication process. In still other embodiments, the first device 120 can be a surveillance station, such as a closed-circuit TV (CCTV) camera, that sends a video feed to the authentication system. The video feed includes images of faces of people, and those images constitute claimant targets. As one example, a store can monitor people entering through a door and begin the authentication process for quicker and easier checkout.

The second device 140 is something the enrolled user possesses, or at least has ready access to. Exemplary second devices 140 include cell phones, PDAs, smart phones, pagers, PCs, home phones, etc. The second device 140 is something that is unique to the user in as much as the second device 140 is characterized by a unique device address such as a phone number, IP address, URL, e-mail address, etc. In various embodiments, the second device 140 is able to receive and render a prompt from the authentication system 110 and/or transmit a response thereto. The prompt can be provided by the second device 140 visually, aurally, or in combination, for example. For instance, the prompt can be displayed as a text message, a verbal command or cue, an audio clip, a video clip, etc. In some instances, the second device 140 can be used by the claimant to provide the biometric response to the authentication system 110. Towards this end, the second device 140 can include a camera capable of taking still images and/or providing video images. The second device 140 may also include other biometric entry devices such as the ones noted above.

It should be appreciated that the use of still images or video images as the biometric response for authentication purposes provides a powerful security feature, in some embodiments. In particular, part of the prevalence of identity theft and electronic fraud lies in the anonymity associated with electronic transactions. It is a very strong deterrent to such malfeasance, however, to have to expose one's face to surveillance in order to perpetrate the fraudulent activity. With the advent of readily available and inexpensive webcams and cameras on cell phones, for example, the widespread implementation of a system that employs video for biometric responses becomes practical.

The first and second communication channels 130, 150, extend between the authentication system 110 and the first and second devices, 120, 140, respectively. The first and second communication channels 130, 150 can be fully duplexed and can each comprise connections made through networks, represented generally by clouds in FIG. 1, such as the public switched telephone network (PSTN), wireless telephone networks, the Internet, wide area networks (WANs) and local area networks (LANs). It should be noted that although each of the first and second communication channels 130, 150 are represented in FIG. 1 as connecting through only one such cloud, either communication channel 130 or 150 can comprise a connection through more than one network and both communication channels 130 and 150 can cross the same network.

It will also be understood that the authentication system 110 can comprise further channels to facilitate communications with other parties to a transaction with a claimant. As described more fully below, a merchant may request an authentication over a third channel (not shown), the authentication then proceeds over the first and second channels 130 and 150 between the claimant and the authentication system 110, and then confirmation of the authentication is sent to the merchant over the third channel.

Figure 2:
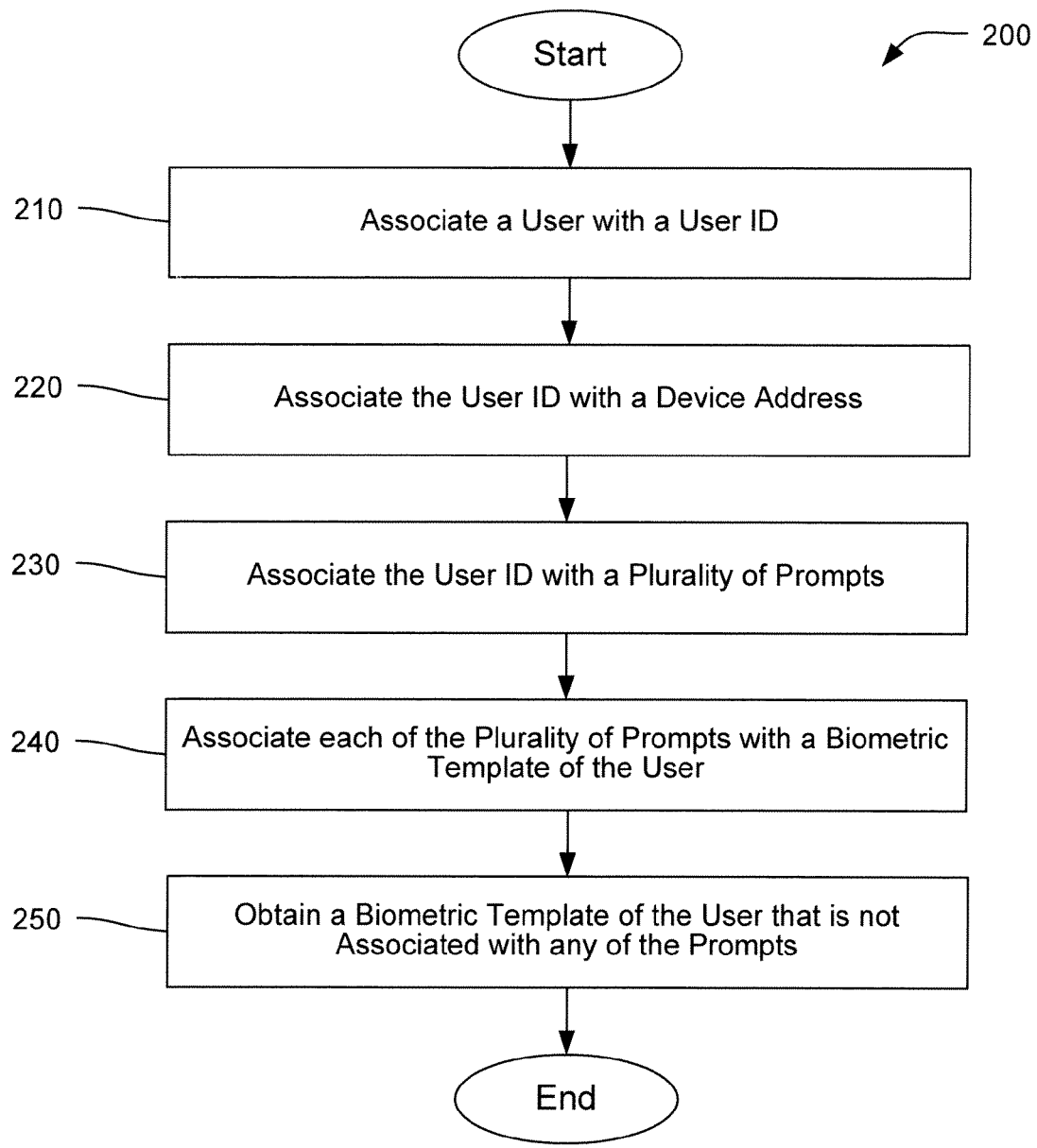
FIG. 2 is a flow-chart representation of an enrollment method according to an exemplary embodiment.

FIG. 2 illustrates an exemplary method 200 for enrolling a user. The method 200 comprises a step 210 of associating a user with a user ID, a step 220 of associating the user ID with a device address, a step 230 of associating the user ID with a plurality of prompts, and a step 240 of associating each of the plurality of prompts with a biometric template or signature of the user. The method 200 can also comprise, in some embodiments, a step of obtaining a biometric template of the user that is not associated with any of the prompts. The method 200 can be implemented, in some embodiments, by communicating with an enrollee user through a kiosk or over the Internet.

In the step 210, the enrollee user is associated with a user ID. This can comprise, for example, assigning a unique numeric or alphanumeric code to the user, or having the user select a unique numeric or alphanumeric code. In some embodiments a password is optionally assigned to, or selected by, the user as an additional security feature. The user ID can also be, in some instances, a biometric template. For example, a file containing a list of features extracted from the user's fingerprint (i.e., a fingerprint template) is one such possible user ID. In some embodiments more than one user ID is associated with the user so that the user can seek authentication multiple ways, such as by entering a code or presenting a finger to a scanner, for example. Step 210 can further comprise providing the user with a token including the user ID, such as a magnetic swipe card, a fob, an RFID tag, etc.

As described in the subsequent steps of the method 200, the user ID is further associated with additional information pertaining to the enrollee user. The user ID and such further information can be stored as records in relational databases, or in other data storage configurations, for later retrieval during an authentication. In addition to the information described below in steps 210-250, other information that can be associated with the user ID through the enrollment method 200 includes addresses, spending limits, access levels, and other third party management information system attributes. Such additional information can be stored locally, or can constitute a link or pointer to a record in an external database.

In step 220 a device address is associated with the user ID. The device address is unique to a communication device that the user has, or has ready access to, such as the second device 140 (FIG. 1). Step 220 can include receiving the device address from the user, for example, where the user enters the device address into a text box in an on-line enrollment form. In some embodiments, receiving the device address from the user comprises reading the device address directly from the communication device. In some instances, where the user has more than one communication device, a device address for each can be associated with the user ID.

The user ID is further associated with a plurality of prompts in step 230. The prompts can include common prompts such as "Say your mother's maiden name," and "Sign your name on the signature pad." In some embodiments, the user selects some or all of the plurality of prompts from a list of predefined prompts such as the common prompts noted above. The prompts selected by the user are then associated with the user ID. In other embodiments, a plurality of predefined prompts is automatically assigned to the user. In some embodiments, still other prompts that can be associated with the user ID are personalized prompts. As used herein, a personalized prompt is a prompt created by the user, for example, "Say the rhyme your daughter loves." The personalized prompts can be recorded in the user's own voice, or entered as text, for example. The number of prompts in the plurality of prompts can be two or more, but preferably is a number that strikes a balance between the security offered by greater numbers of prompts and the burden on the user to enroll large numbers of prompts and associated responses. In some embodiments, the number of prompts is 5, 6, 7, 8, 9, or 10 at the time of enrollment, and may be increased subsequently.

It should be appreciated that the use of a personalized prompt for authentication purposes provides a powerful security feature, in some embodiments. In particular, part of the prevalence of identity theft and electronic fraud lies in the availability of information through contracts and electronic databases. Prompts including questions such as "what is your mother's maiden name?" and "what is the name of your youngest sibling?" are easily discovered through contracts or Internet searches. A personalized prompt such as "color of my teenage dream car" is not readily known and whose response cannot be easily identified even by a spouse. With the increase in identity theft and a significant part of identity theft being perpetrated by family members, personalized prompts present a significant hurdle for even a person's closest associates.

In step 240 each of the plurality of prompts is associated with a biometric template of the enrollee user. For example, where the prompt is an instruction to say some word or phrase, the biometric template can be a voice template derived from the user saying the word or phrase. Here, associating the prompt with the biometric template can include providing the prompt to the user and receiving audio data (e.g., a .wav file) of the user's response. Associating the prompt with the biometric template can further include, in some instances, processing the received audio data to extract the biometric template. The biometric template can be, in some embodiments, a filtered or enhanced version of the originally received audio data, such as with background noise removed, or averaged over multiple repetitions by the user. The biometric template can also include a set of markers or values derived from the audio data.

Other examples of biometric templates include fingerprint templates derived from users' fingerprints; signature templates derived from users' signatures, and in some instances also derived from aspects of the act of creating the signature such as rate and pressure of the writing implement as a function of time; facial recognition templates derived from still or video images of users' faces; iris scan templates derived from users' iris scans; and so forth. A biometric template can also comprise an unprocessed biometric response, such as a .wav file of the user's voice, a .jpg file of an image of the user's face, etc.

It will be appreciated that the biometric template associated with any particular prompt need not make sense to anyone other than the user, adding still another security feature in some cases. For example, the user can create the prompt "Monday morning" and associate with that prompt a biometric template derived from saying "marvelous marigolds." Even if someone were to sample enough of the user's voice to reasonably model the user's voice, it would be virtually impossible to know the correct response to the particular prompt.

In some embodiments step 240 includes the use of voice recognition. Voice recognition is distinguished here from voice identification in that voice recognition can distinguish spoken words independent of the speaker, whereas voice identification associates the individual with the acoustics of the phrase without regard for the meaning of the words spoken. Thus, for instance, a user can create a personalized prompt by saying a phrase and then voice recognition can be employed by the authentication system to extract the phrase from a recording of the user saying the phrase. The extracted phase can then be stored as the biometric template, as a component of the biometric template, or as a completely separate record.

Step 250 is an optional step that comprises obtaining a biometric template of the user that is not associated with any of the prompts. For example, enrolling the user can comprise capturing a digital image of the user's face. The image can be associated with the user ID but not with any particular prompt. Should the user have problems with a subsequent authentication and end up speaking with a live operator, provided that the communication with the live operator is over a video conference or something similar, then the operator can compare the stored digital image of the user's face with the image of the claimant. Additionally, method 200 can optionally comprise associating additional user information with the user ID. Examples of additional user information include home address, home phone number, credit card numbers, system preferences and user settings, and so forth.

Figure 3:
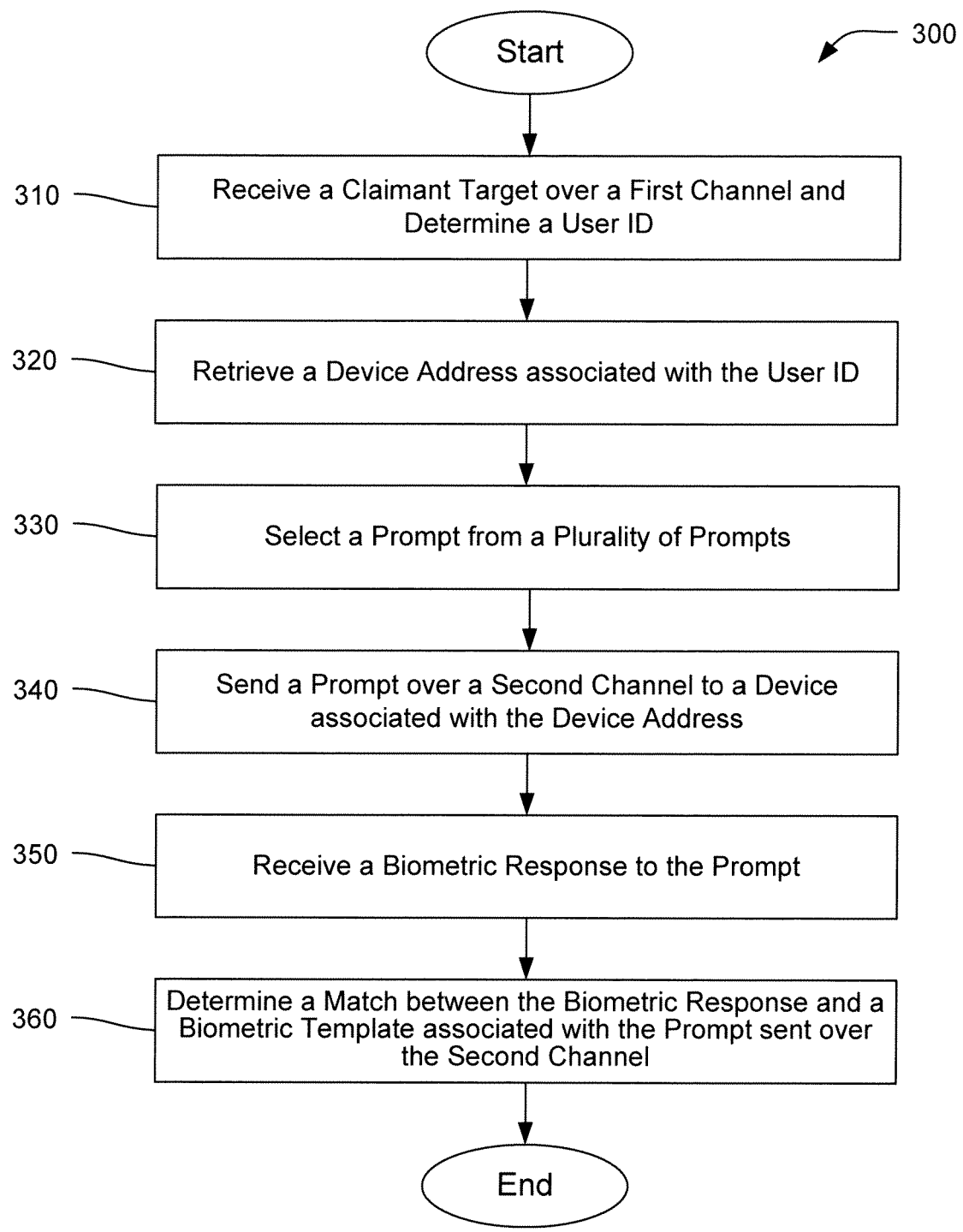
FIG. 3 is a flow-chart representation of an exemplary authentication method according to an exemplary embodiment.

FIG. 3 illustrates an exemplary method 300 for authenticating a claimant. The method 300 comprises a step 310 of receiving a claimant target over a first channel, a step 320 of retrieving a device address associated with the user ID, an optional step 330 of selecting a prompt from a plurality of prompts where each of the plurality of prompts is associated with a biometric template of a user, and a step 340 of sending a prompt, such as the prompt selected in step 330, over a second channel to a device associated with the device address. The method 300 further comprises a step 350 of receiving a biometric response to the prompt, and a step 360 of determining a match between the biometric response and a biometric template associated with the prompt sent over the second channel.

In step 310 a claimant target is received over a first channel. In some embodiments the claimant target comprises a user ID, while in other embodiments the method 300 further comprises determining the user ID from the claimant target. In some embodiments where the claimant target comprises the user ID, the user ID can be a numeric or alphanumeric character string, for example, such as an e-mail address or a user name selected by an enrollee user during the enrollment method 200 (FIG. 2). In other embodiments where the claimant target comprises the user ID, the user ID is a template such as a fingerprint template or an iris scan template. As one example, a fingerprint scanner on a kiosk scans the claimant's fingerprint, reduces the scan to a fingerprint template, and then sends the template to the authentication system which receives the template as the claimant target.

As note previously, in some instances the claimant target is not the user ID itself, and in these embodiments the method 300 further comprises determining the user ID from the claimant target. Returning to the prior example of the claimant at the kiosk, the kiosk could instead transmit to the authentication system the scan of the fingerprint without further processing. Here, the authentication system would further determine the user ID from the claimant target by reducing the scan to the fingerprint template.

In some embodiments, step 310 also comprises receiving an authentication request, which in some embodiments precedes receiving the user ID and in some embodiments includes the user ID. For example, a claimant seeking to complete a transaction with another party can send an authentication request including her user ID to the authentication system. Similarly, the authentication request, including the user ID, may come from another party, such as a merchant. In still other embodiments, either the claimant or the other party to the transaction can make the request for authentication and subsequently the claimant is prompted by the authentication system to submit the user ID. It should be noted that in some embodiments that claimant also supplies a password with the user ID, while in other embodiments a password is not required. Thus, in these latter embodiments, step 310 specifically does not comprise receiving a password.

After step 310, a device address associated with the user ID is retrieved in step 320. The device address can be retrieved, for example, from a database that associates device addresses with user IDs. Step 320 can also comprise retrieving a record associated with the user ID, where the record includes one or more device addresses as well as other information such as prompts and biometric templates.

In optional step 330 a prompt is selected from a plurality of prompts, where each of the plurality of prompts has a biometric template of the claimant associated therewith. In some embodiments, the plurality of prompts is ordered, say from first to last, and the act of selecting the prompt simply comprises identifying the next prompt in the order based on the last prompt used. Other embodiments employ randomization algorithms. A rule can be implemented, in some embodiments, that the same prompt from the plurality of prompts cannot be used in successive authentications. Similar rules can be implemented to prevent the same prompt from being employed twice within any three authentications, and so forth. Yet another rule that can be implemented applies where several of the biometric templates each include voice data comprising at least two syllables. Here, the rule requires that the same two syllables used in one authentication cannot be used in the next subsequent authentication.

In step 340, a prompt is sent over a second channel to a device associated with the device address. The device may be a cell phone, PDA, smart phone, PC, and so forth. In the limiting case where there is only a single prompt associated with the user ID, for example, the step 330 of selecting a prompt from a plurality of prompts is unnecessary and step 340 simply comprises sending the one prompt. Where the prompt is selected in step 330 from a plurality of prompts, step 340 comprises sending the selected prompt. In some instances, the prompt is sent in a text message according to the Short Message Service (SMS) communications protocol. In other embodiments, the prompt is delivered as a voice transmission such as an audio recording or as synthesized speech. The prompt can similarly comprise a video transmission. The prompt can also be sent as an e-mail or an Instant Message.

It should be noted that instructions can also be sent to the claimant, over either channel, in addition to the prompt. As one example, the claimant submits a claimant target over a first channel from a PC, and receives a prompt on her cell phone over a second channel. The prompt is a text message of the word "Rosebud." An instruction can be sent over the first channel to be displayed on the PC such as "A prompt has been sent to you. After the red light appears on your screen, face the webcam and provide your response to the prompt." Still another security feature lies in the fact that it is not readily apparent from an instruction how the prompt should be received. Someone intercepting the instruction would not readily know whether the prompt was sent to a web browser, in an e-mail, or to a mobile device, for example.

After step 340, a claimant receives the prompt and acts accordingly to produce some biometric response. For example, the claimant can speak to a microphone, present her face or another body part to a camera, make a gesture in front of a camera, press her finger on a fingerprint scanner, present her eye to a retinal scanner, write on a touch-sensitive pad, or combinations of these. The biometric response is therefore some product of the claimant's actions such as a voice data, a fingerprint scan, retinal scan, or an image of the person's face or body part, for example. The biometric response can comprise unprocessed data, partially processed data, or can be completely reduced to a template, for example.

The method 300 further comprises the step 350 of receiving the biometric response to the prompt. The biometric response can be received from the same device that received the prompt, or in other embodiments from the same device that sent the claimant target. The biometric response may even be received from a third device over some third channel, in some embodiments.

Step 360 comprises determining a match between the biometric response and a biometric template associated with the prompt sent over the second channel. In a simple example, the biometric template comprises a facial recognition template of a user and the biometric response comprises a segment of streaming video that includes frames showing the claimant's face. Here, determining the match comprises extracting a facial recognition template of the claimant's face from the frames of the video segment and comparing that facial recognition template to the original facial recognition template of the user.

It will be appreciated, moreover, that step 360 can comprise matching more than one biometric template to the biometric response. For instance, in the above example, the segment of streaming video can also include the claimant saying a phrase. Here, a voice template can be extracted in addition to extracting a facial recognition template. In this example a match can be determined between a voice template and the voice in the video, and a match can be determined between a face template and the face in the video.

In various embodiments, determining the match between the biometric response and the biometric signature comprises determining a figure of merit that characterizes the agreement between the biometric response and the biometric template, and then comparing that figure of merit to a threshold. If the figure of merit exceeds the threshold, or in some instances equals or exceeds the threshold, then the match has been determined. Where more than one biometric template is compared to the biometric response, in some embodiments, a figure of merit for each biometric template is calculated and each figure of merit is compared to the relevant threshold.

In those embodiments where the biometric response comprises a vocal response from the claimant, determining the match between the biometric response and the biometric template in step 360 can comprise performing voice recognition on the biometric response to determine whether the correct word or words were spoken. Voice recognition has the benefit of being less computationally intensive than voice identification, therefore, a useful screen can be to employ voice recognition to determine whether the correct word or words are present in a biometric response.

If the match cannot be determined, an optional step of the method 300 comprises repeating method 300 beginning at step 320, preferably by selecting a different prompt in step 330 than in the previous iteration. Another optional step if the match cannot be determined comprises establishing a live interview between the claimant and a customer service representative. The customer service representative, in some instances, has the authority to authenticate the claimant based on the interview. As noted previously, the customer service representative may be able to employ biometric templates that are not associated with any of the prompts to decide whether to authenticate the claimant.

Figure 4:
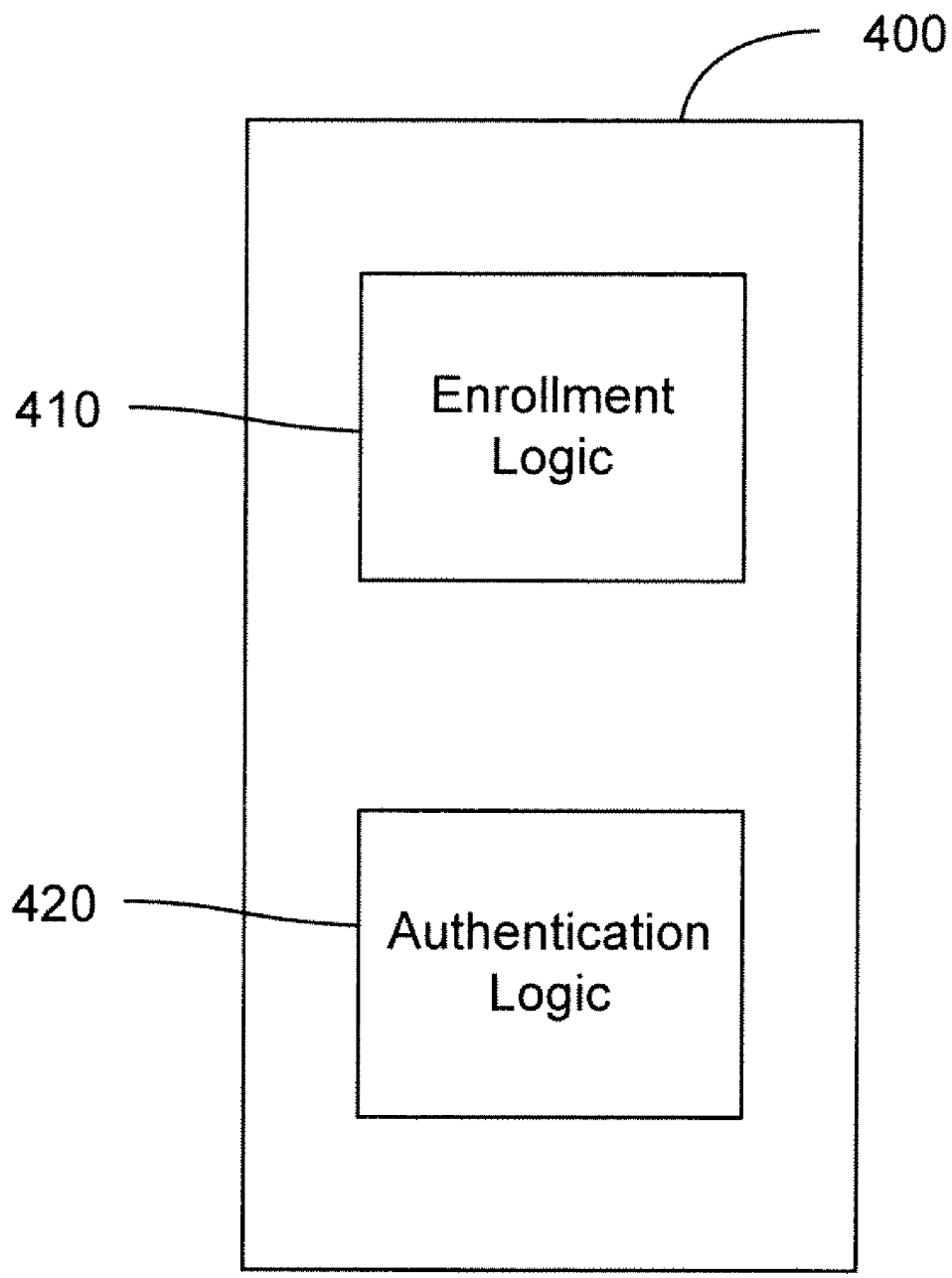
FIG. 4 is a schematic representation of an authentication system according to an exemplary embodiment.

FIG. 4 shows an exemplary embodiment 400 of the authentication system 110 (FIG. 1). The authentication system 400 of FIG. 4 comprises logic 410 configured to enroll users and logic 420 configured to authenticate claimants. In various embodiments, logic 410 and 420 each can comprise hardware, firmware, software stored on a computer readable medium, or combinations thereof. Logic 410, 420 may include a computing system such as an integrated circuit, a microprocessor, a personal computer, server, distributed computing system, communication device, network device, or the like. For example, logic 410 and 420 can be implemented by separate software modules executed on a common server. In other embodiments, logic 410 and 420 can be implemented on different computing systems. Logic 410 and 420 can also be at least partially integrated together.

The authentication system 400 can also comprise, as part of the logic 410, 420 or separate therefrom, volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing digital or analog information. Logic 410 can comprise, for instance, volatile and/or non-volatile memory as the computer readable medium on which software is stored for performing the methods described herein. Other volatile and/or non-volatile memory can comprise databases or other means for maintaining information about enrolled users. Such information can be created and revised by logic 420 and accessed by logic 410.

The authentication system 400 can also comprise communications logic that allows the logic 410 and 420 to communicate, for example, with the first device 120 (FIG. 1) over the first communication channel 130 (FIG. 1) and the second device 140 (FIG. 1) over the second communication channel 150 (FIG. 1). In some embodiments the communications logic allows the logic 420 to interface with multiple devices in parallel to support the simultaneous enrollment of multiple users. At the same time, the communications logic allows the logic 410 to independently interface with multiple other devices to support the simultaneous authentication of multiple claimants.

The enrollment logic 410 is configured to enroll a user by performing an enrollment method such as method 200 (FIG. 2). In an exemplary embodiment, the enrollment logic 410 is configured to associate the user with a user ID, associate the user ID and with a device address, associate a plurality of prompts with the user ID, and associate a number of biometric templates each with one of the plurality of prompts. The enrollment logic 410, in some embodiments, is configured to associate the plurality of prompts with the user ID by presenting a set of pre-defined prompts to the user and receiving a selection of the plurality of prompts from the set. In additional embodiments, the enrollment logic 410 is further configured to allow the user to create a personalized prompt. The enrollment logic 410 can also comprise a computer readable medium that stores software instructions for performing these steps.

The authentication logic 420 is configured to authenticate a claimant by performing an authentication method such as method 300 (FIG. 3). In an exemplary embodiment, the authentication logic 420 is configured to receive a claimant target over a first channel, retrieve a device address associated with a user ID, send a prompt from the plurality of prompts to a device associated with the device address over a second channel, receive a biometric response to the prompt, and determine a match between the biometric response and a biometric template associated with the prompt. In some embodiments the claimant target comprises the user ID, while in other embodiments the authentication logic is further configured to determine the user ID from the claimant target. The authentication logic is further configured to send a key, in some instances, where the key can be used for encryption and/or creating a watermark. In some of these embodiments the prompt includes the key when sent. Encryption and watermarking are described in greater detail below. The authentication logic 420 can also comprise a computer readable medium that stores software instructions for performing these steps.

Figure 5:
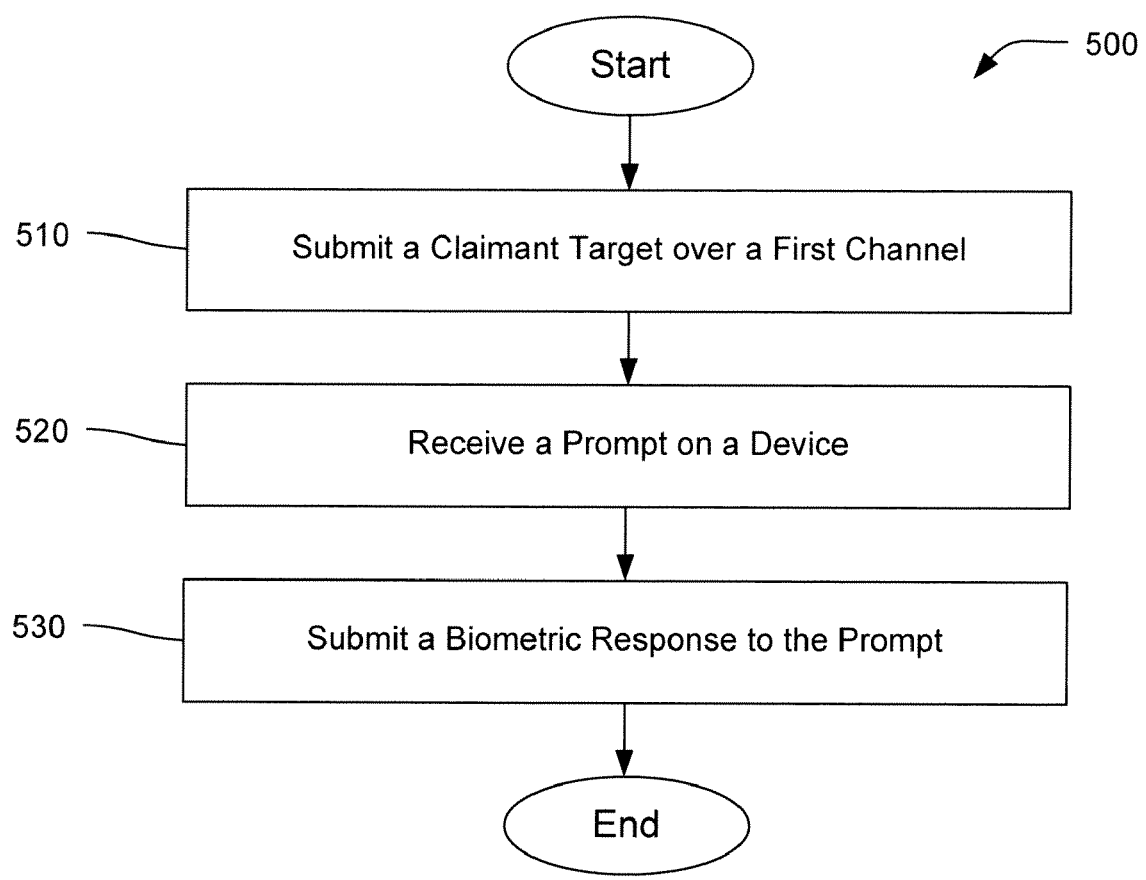
FIG. 5 is a flow-chart representation of an exemplary method for a claimant to be authenticated according to an exemplary embodiment.

FIG. 5 shows an exemplary authentication method 500 that can be performed, for example, by a claimant. The method 500 comprises a step 510 of submitting a claimant target over a first channel, a step 520 of receiving a prompt on a device, and a step 530 of submitting a biometric response to the prompt. In method 500, one of the two steps of receiving the prompt and submitting the biometric response is performed over a second channel. In some embodiments, the claimant performing the method 500 only has to perform these three steps to be authenticated.

In step 510, the claimant submits the claimant target, such as the user ID, to an authentication system, for example, or to some intermediary such as a merchant that then relays the claimant target to the authentication system. Since the method 500 can be performed by a claimant seeking to complete an electronic transaction from home, work, or in public, in step 510 the claimant can submit the claimant target from a PC at home, from a kiosk in a shopping mall, or from at a terminal at a store check-out, for example. The claimant can submit the claimant target, according to various embodiments, by entering numbers and/or letters with a keyboard or keypad, swiping a magnetic card through a card reader, bringing an RFID tag within range of an RFID reader, writing with a stylus on a touch-sensitive pad, placing a finger on a fingerprint reader, speaking within range of a microphone, smiling for a camera, combinations thereof, and so forth.

Then, in step 520, the claimant receives a prompt on a device that the claimant has, or has ready access to. The device that receives the prompt may be a hand-held device such as a cell phone, PDA, or smart phone, or the device can be some other communication device such as a PC, and so forth, as described above. As also previously noted, examples of the prompt include a text message, e-mail, an Instant Message, an audio recording, a video, or synthesized speech. In some embodiments, the prompt includes a warning that if the recipient of the prompt is not seeking authentication, then an unauthorized authentication attempt is in progress and to contact the Administrator.

Next, in step 530, the claimant submits a biometric response to the prompt. The claimant can submit the biometric response, according to various embodiments, by writing with a stylus on a touch-sensitive pad, placing a finger on a fingerprint reader, placing one eye in proximity to an iris scanner, speaking within range of a microphone, speaking to a camera, combinations thereof, and so forth.

In method 500 one of the two steps of receiving the prompt 520 and submitting the biometric response 530 is performed over a second channel. For example, the claimant can submit the claimant target from a PC over a first channel in step 510, and receive the prompt with a cell phone over a second channel in step 520. Here, the claimant can provide the biometric response in step 530 over either the first channel or the second channel, in different embodiments. In another example, the claimant submits the claimant target from the PC over the first channel in step 510, the claimant receives the prompt on the PC again over the first channel (e.g., the prompt can be the following text message: "say your mother's maiden name"), the claimant's cell phone rings, and in step 530 the claimant submits the biometric response over the cell phone, here the second channel.

It will be appreciated that a method performed by an authentication system in this last example is a variant of the method 300 (FIG. 3) described above. In this variant, rather than sending the prompt over the second channel to the device associated with the device address in the step 340, a second channel is instead established to a device associated with the device address. Subsequently, rather than receiving a biometric response to the prompt in the step 350 over an unspecified channel, instead a biometric response to the prompt is specifically received over the second channel.

Additional security features that can be incorporated are further described below. For example, any of the electronic communications described herein can be encrypted according to well known encryption protocols. As another example, a watermark can be added to any biometric response sent to the authentication system. For instance, a webcam comprising a camera and a microphone can be set with a key. The key is transmitted to the user either through a secure channel or a separate channel so that unauthorized users would not be aware of the key. The watermark can be based at least in part on the key. For instance, image data can be altered by discrete cosine transform (DCT) coefficients based on the key. Of course, other algorithms can be similarly employed. Audio data can likewise be watermarked. The key used for watermarking can also be the same key employed for encryption, in some embodiments.

In the previous example, the key for the watermark can be transmitted to the claimant at the time of authentication for still further security. For instance, the prompt received over the second channel can include the key (e.g., "Please enter the following key to your webcam, wait for the red light, and then say your birth date."). For still further security, the webcam (or any other device for recording a biometric response) can include a dedicated keypad for entering the key, where the keypad is not otherwise connected to any computing system. Here, there is no electronic way to intercept the key between the device that receives the key and the keypad of the webcam. For still further security the possible keys would be non-repeating so that a fraudulent authentication attempt can be determined by detecting the use of a previously used key. Even additional security can be achieved by having keys expire within a period of time, such as 30 seconds, after being issued.

In some embodiments, the biometric entry device (e.g., webcam, fingerprint reader, etc.) does not have a dedicated keypad to enter a key. In some of these embodiments, the key can be entered through a shared keypad or keyboard. For example, a PC with an integrated webcam would allow the key to be entered on the PC's keyboard. Here, the PC can include logic that when activated, connects the keyboard to the biometric entry device and simultaneously disconnects the keyboard from the computer and disables the ability of other programs running on the PC to access key press notifications, thus rendering spyware ineffective. In some of these embodiments, the logic can render an onscreen prompt to enter the key for the biometric entry device. For further security, the logic can echo keystrokes and codes as asterisks or other characters so as not to expose the actual keystrokes.

In another embodiment, where a webcam or similar device acquires the biometric response, two video streams can be produced. The first video stream is neither encrypted nor watermarked and is displayed on a screen for the benefit of the claimant, while the second stream is encrypted and/or watermarked and sent to the authentication system. Here, anyone observing the displayed first video stream would not be able to infer that the second video stream is watermarked and/or encrypted. Having the first video stream provides the claimant with the ability to center her image in the field of view of the camera. Here, allowing the claimant to see her displayed image can potentially expose the image data to being captured with spyware. To avoid this, a further security feature comprises replacing the raw video image of the claimant with a placement indicator, such as an avatar. In this way, the claimant can center herself in the field of view by watching a representation of the claimant on the screen.

A still further security feature is achieved through hybrid prompts. A hybrid prompt is a prompt that the user selected during enrollment that is modified during authentication. For instance, the user during enrollment selects the prompt "Say your favorite movie." Subsequently, during authentication, the claimant receives the hybrid prompt "Say you favorite movie, then say spark plug." Here, the original prompt has been modified to also ask for random words or a random phrase. Voice recognition can then be employed to determine whether the words added to the original prompt were spoken in the biometric response. If so, voice identification can be applied to the portion of the biometric response that includes the response to the original prompt. Furthermore, that portion of the biometric response that includes the added random words can be saved as further biometric templates from the user.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for authenticating a user comprising:
receiving a claimant target over a first channel;
retrieving a device address associated with a user ID;
sending a prompt over a second channel to a device associated with the device address, the prompt being one of a plurality of prompts, each of the plurality of prompts having a biometric template of the user associated therewith;
receiving a biometric response to the prompt; and
determining a match between the biometric response and a biometric template associated with the prompt that was sent over the second channel.

2. The method of claim 1 wherein the claimant target comprises the user ID.

3. The method of claim 1 further comprising determining the user ID from the claimant target.

4. The method of claim 1 not comprising receiving a password.

5. The method of claim 1 wherein the device address is a phone number.

6. The method of claim 1 wherein at least one of the prompts comprises a personalized prompt.

7. The method of claim 1 further comprising selecting the prompt from the plurality of prompts.

8. The method of claim 7 wherein selecting the prompt is performed according to a rule that the same prompt is not used in successive authentications.

9. The method of claim 1 wherein sending the prompt includes sending a SMS.

10. The method of claim 1 wherein the biometric response is received over the first channel.

11. The method of claim 1 wherein the biometric response is received over the second channel.

12. The method of claim 1 wherein determining the match between the biometric response and the biometric signature includes performing voice recognition.

13. The method of claim 1 wherein determining the match between the biometric response and the biometric signature includes performing voice identification.

14. The method of claim 1 wherein the prompt comprises a hybrid prompt including a random word.

15. The method of claim 14 further comprising applying voice recognition to the random word.

16. The method of claim 15 further comprising storing a biometric signature corresponding to the random word.

17. A method for authenticating a user comprising:
receiving a claimant target over a first channel;
retrieving a device address associated with a user ID;
establishing a second channel to a device associated with the device address;
sending a prompt to the user, the prompt being one of a plurality of prompts, each of the plurality of prompts having a biometric template of the user associated therewith;
receiving a biometric response to the prompt over the second channel; and
determining a match between the biometric response and a biometric template associated with the prompt sent over the second channel.

18. The method of claim 17 wherein the claimant target comprises the user ID.

19. The method of claim 17 further comprising determining the user ID from the claimant target.

20. The method of claim 17 further comprising selecting the prompt from the plurality of prompts.

21. The method of claim 17 wherein sending the prompt to the user comprises sending the prompt over the first channel.

22. A method for authentication consisting of:
a claimant submitting a unique identifier over a first channel;
the claimant receiving a prompt on a device; and
the claimant submitting a biometric response to the prompt, where one of the two steps of receiving the prompt and submitting the biometric response is performed over a second channel.

23. The method of claim 22 wherein the prompt comprises a personalized prompt.

24. The method of claim 22 wherein the device is a handheld device.

25. An authentication system comprising:
enrollment logic configured to enroll a user by
associating the user with a user ID,
associating the user ID and with a device address,
associating a plurality of prompts with the user ID, and
associating a plurality of biometric templates each with one of the plurality of prompts; and
authentication logic configured to authenticate a claimant as the user by
receiving a claimant target over a first channel,
retrieving a device address associated with the user ID,
sending a prompt from the plurality of prompts to a device associated with the device address over a second channel,
receiving a biometric response to the prompt, and
determining a match between the biometric response and a biometric template associated with the prompt.

26. The authentication system of claim 25 wherein the enrollment logic is further configured to associate the plurality of prompts with the user ID by presenting a set of predefined prompts to the user and receiving a selection of the plurality of prompts therefrom.

27. The authentication system of claim 25 wherein the enrollment logic is further configured to allow the user to create a personalized prompt.

28. An authentication system comprising authentication logic configured to authenticate a claimant by
receiving a claimant target over a first channel;
retrieving a device address associated with a user ID;
sending a prompt from a plurality of prompts to a device associated with the device address over a second channel;
receiving a biometric response to the prompt; and
determining a match between the biometric response and a biometric template associated with the prompt.

29. The authentication system of claim 28 wherein the claimant target comprises the user ID.

30. The authentication system of claim 28 wherein the authentication logic is further configured to determine the user ID from the claimant target.

31. The authentication system of claim 28 wherein the authentication logic is further configured to send a key.

32. The authentication system of claim 31 wherein the key expires within a period of time.

33. The authentication system of claim 28 wherein the prompt includes a key.

* * * * *

UNITED STATES PATENT AND TRADEMARK OFFICE
CERTIFICATE OF CORRECTION

PATENT NO. : 8,006,291 B2
APPLICATION NO. : 12/119617
DATED : August 23, 2011
INVENTOR(S) : Paul Headley et al.

Page 1 of 1

It is certified that error appears in the above-identified patent and that said Letters Patent is hereby corrected as shown below:

Column 15, Claim 12, Line 23
Please delete "signature" after the word biometric and insert --template--.

Column 15, Claim 13, Line 26
Please delete "signature" after the word biometric and insert --template--.

Signed and Sealed this
Twelfth Day of February, 2013

Teresa Stanek Rea
*Acting Director of the United States Patent and Trademark Office*